June 7, 1927.
G. THORTVEDT
1,631,234
TRACTOR POTATO DIGGER
Filed Sept. 23, 1925   2 Sheets-Sheet 1
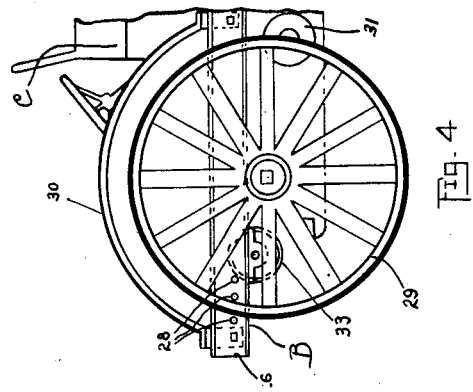
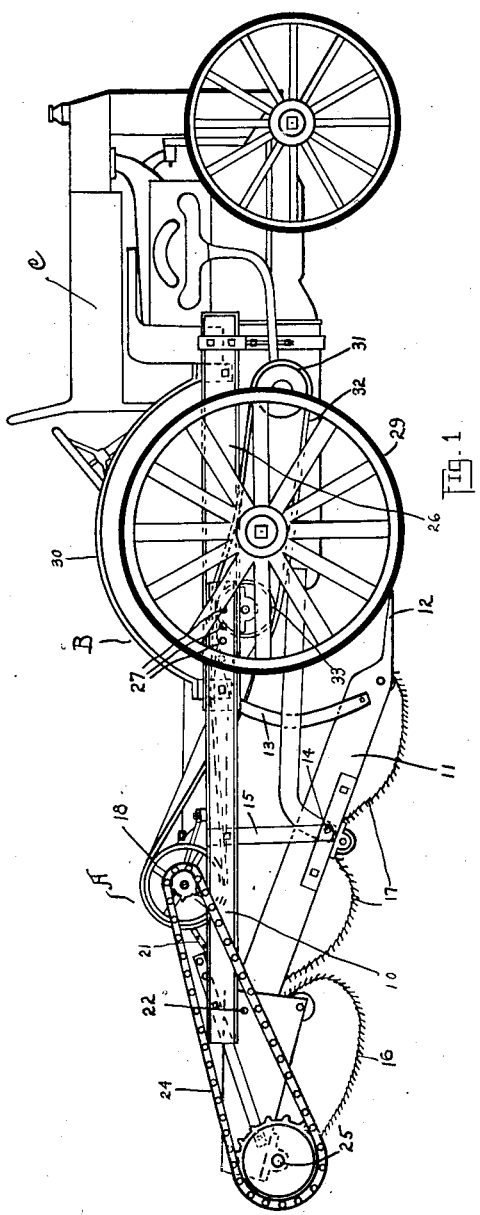
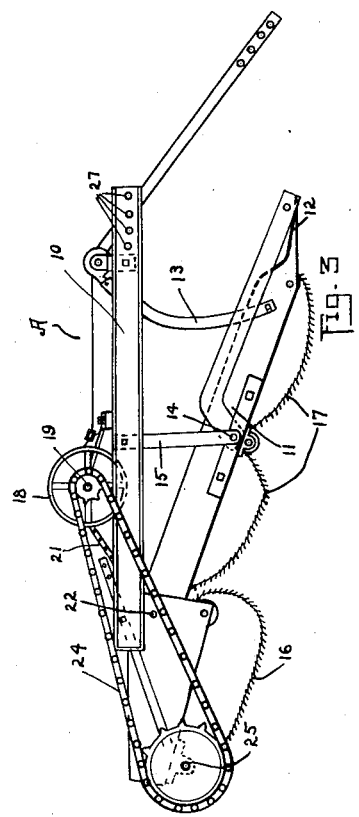
Inventor
Goodwin T. Thortvedt
By *Amaipiche*
Attorney

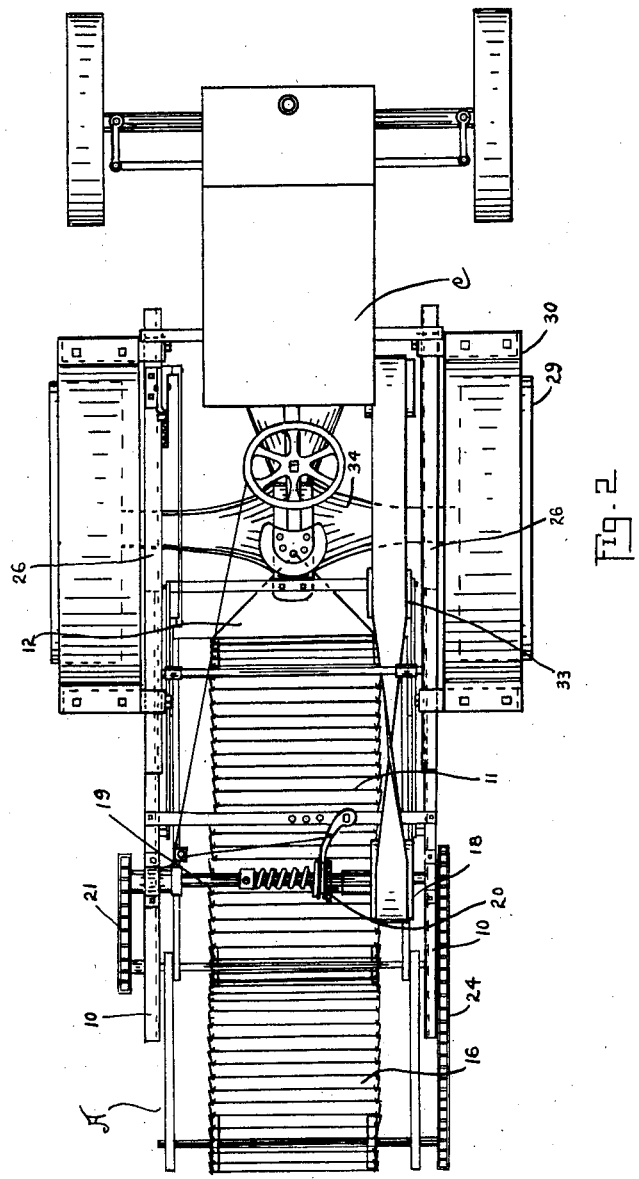

Patented June 7, 1927.

1,631,234

UNITED STATES PATENT OFFICE.

GOODWIN THORTVEDT, OF GLYNDON, MINNESOTA.

TRACTOR POTATO DIGGER.

Application filed September 23, 1925. Serial No. 58,063.

My invention relates to a tractor potato digger detachably connected to a tractor so that the digger is attached close to the tractor with the digging shoe in close proximity to the tractor drive wheels.

A feature of my invention is in a digger which is detachably secured to a permanent frame adapted to be carried by a tractor and which constitutes a portion of the supporting means for holding tractor fenders for the driving wheels. My digger is formed with channel members extending along the top of the digger and is provided with means so that these channel members can slide within the channel members of the frame which is carried rigidly by the tractor and then by means of suitable connecting and adjusting openings the channel members are secured together in a manner so as to rigidly attach the potato digger frame to the rigidly attached frame carried by the tractor.

It is also an object of my invention to provide a detachable tractor unit which is adapted to be driven by means of a belt from the drive pulley on the tractor and in this manner drive the potato digger unit with its operating means forming a source of power which operates from the tractor independent of the driving wheels of the tractor. This is an important feature of my invention as it permits the digger to be operated in a manner so that its operating unit can operate independent of the driving wheels of the tractor which permits the earth and the potatoes to be carried up rapidly or more slowly irrespective to the speed of the driving wheels of the tractor. In so far as I know, ordinarily, the tractor potato diggers now in use are operated from the drive wheels of the potato digger and thus when the wheels stop operating or slow down, the digger also slows down. This is not true of my potato digger unit and I thereby accomplish a result which is very desirable.

These features and other objects, together with the peculiar formation and particular design of my detachable potato digger tractor unit will be more clearly and fully set forth in the specification and claims.

In the drawings forming a part of this specification;

Figure 1 is a side view of my tractor potato digger unit connected to a tractor.

Figure 2 is a plan view of the same.

Figure 3 illustrates my tractor potato digger unit detached from the tractor.

Figure 4 illustrates the rear portion of the tractor when the digger unit has been separated therefrom.

In the drawings my tractor potato digger unit A is of a practical simple construction having side channel members 10 which form the frame and upper portion of the unit A and extend on either side of the same.

These channel members 10 carry the potato digger elevator 11 which is provided with a digging shoe 12 on the forward end of the same and is adjustably positioned by the operating lever 13. The elevator 11 is pivotally connected at 14 to the supporting arms 15 so that the operating lever 13 can raise and lower the front end and shoe 12 of the digging unit A.

My digging unit A is provided with a rear belt carrier 16 which co-acts with the front belt 17 of the elevator 11 in a manner so that the belt 17 discharges on the belt 16. This permits the front elevator band 17 to operate to carry the heavy load of earth and potatoes up to the portion 16 which operates to discharge the potatoes off from the back of the same in a more satisfactory manner.

The elevating belt 17 is operated by the pulley 18 which is mounted on the shaft 19 and adapted to freely rotate on the shaft. By means of the clutch 20 which is keyed to the shaft 19 and which is operated in the ordinary well known manner, the shaft 19 is rotated when the clutch is in operating position with the pulley 18, and the elevator belt 17 is operated by means of a side chain 21 which is connected on the outer end of the shaft 19 at one side of the unit A. This chain 21 connects with the shaft 22 which operates the elevating belt 17.

My means of the chain 24 which is mounted on the opposite side to the chain 21, I drive the shaft 25 from the shaft 19 to operate the belt 16 on the rear portion of the unit A.

My unit A is adapted to engage with the permanently fixed frame B on the tractor C by sliding the members 10 into engagement with the channel members 26 on the frame B, and by means of the bolt openings 27 on the frame members 10, and the openings 28 on the frame members 26, I bolt the channel members 10 and 26 rigidly together with the digging shoe 12 extending between the drive wheels 29 of the tractor C and in close proximity to the same so that the digging by the unit A is brought into close relation to the power propelling means of the tractor C. This is an important feature in a detachable tractor unit and permits the digging to be operated successfully.

When the unit A is rigidly attached, as illustrated in Figure 1, to the tractor C, the frame B which is provided with the wheel fenders 30 carries the unit A supported rigidly to the tractor C. This provides a construction wherein the tractor unit becomes practically a part of the tractor while in operation, yet permits the same to be readily disengaged from the tractor when it is desired.

The tractor C is provided with a drive pulley 31 which is operated independently of the drive wheels 29 by suitable operating means of ordinary well known construction in tractors to provide a drive pulley for taking off power from the tractor, or when the tractor is in operation, that is, in traction over the road or when it is stationary. The drive pulley connects by the belt 32 with the pulley 18 on the tractor potato digger unit A in a manner so that the belts 16 and 17 of the unit A can be operated even when the drive wheels 29 are stopped. This provides a tractor potato digger unit which permits the digger unit to be clear in heavy digging and also permits the unit to be operated faster than the drive wheels are operated if it is desired. In this manner the potato digger unit is more successfully and practically operated with the tractor C. It is to be noted that this independent connection of the potato digger unit A from a separate source of operation on the tractor C, than the operation of the tractor wheels 29, provides a digger unit of a more satisfactorily operated means than where the drive wheels 29 of the tractor operate the operating portions of the digger unit. I have found this to be true in the tractor digger units which I have made up and operates so that very satisfactory results have been accomplished. The belt 32 travels over the idle pulley 33 to carry the belt over the axle 34 of the tractor C and after passing over the idle pulley is crossed in a manner so as to engage the pulley 18 and drive the same in the proper direction.

My tractor potato digger unit is of a very simple, effective nature, being easily and quickly attached or disengaged from the tractor C and when it is attached thereto the channel frame members 10 and 26 form a continuous, rigid frame extending from the tractor C back to the end of the potato digger A and thereby forming rigid, firm supporting means for holding the potato digger parts in operation. As the tractor is operated through the potato field the digger can be set into operation by the clutch 20, when it is desired, and operated from the power pulley 31 in a manner so as to continue to operate even when the drive wheels 29 are out of operation or are operating very slowly. Thus the potatoes are dug up from the ground in a very practical manner and separated from the earth by the power pulley 31 and the belt drive means 32 without affecting the tractor operation in traction over the road. The belt permits slipping if the digging becomes too heavy which is readily apparent to the operator and the speed of the tractor can be slackened until the digger unit has cleared itself of the heavy load. Thus if the digging becomes too heavy which is readily apparent to the operator, the speed of the tractor can be slackened by shifting the gears to low speed and letting the tractor run at this speed until the digger unit has cleared itself of the heavy load. Such a construction for a potato digging tractor unit is of great utility as the potatoes may be more heavily supported in one place than another and where there is a heavy load of potatoes, it is apparent that in the operation of the tractor, the same can be slowed down while the unit A clears itself of potatoes, or the tractor stopped if it is necessary while the digger unit A clears itself of its heavy load.

In accordance with the patent statutes I have described the principles of operation of my tractor potato digger unit, and while I have illustrated a particular formation and construction in the drawings, I desire to have it understood that these drawings are only illustrative of a means of carrying out my invention and that it may be applied to uses other than those above set forth within the scope of the following claims.

I claim:

1. A tractor potato digger unit having, a frame which is adapted to be detachably connected to a rigid frame fixed on a tractor, a digging shoe, an elevating conveyer associated with said shoe, a channel frame adapted to support said elevating conveyer and shoe, a drive pulley, means for connecting said drive pulley with said conveyer and a belt for connecting said drive pulley with the power pulley on a tractor to which said unit is attached.

2. A potato digger including, a tractor, a frame rigidly fixed to said tractor, said frame including a pair of channel members on either side thereof, a digger unit detachably connectable to said fixed frame, said unit including a pair of channel shaped frame members adapted to fit within the channel member of said fixed frame and to be rigidly attached thereto to support said unit rigidly to said tractor, extending from the rear end of said tractor and elevated in a manner to clear the ground in back of said tractor and means for operating said digger unit direct from the power means of the tractor.

3. A tractor potato digger including, a tractor having a pair of drive wheels, a frame fixed adjacent said wheels, said frame including a pair of channel shaped side members, a detachable digger unit having a pair of channel shaped frame members adapted to fit within the fixed frame on said digger in a manner to rigidly attach the potato digger unit adjacent and in close proximity to the said drive wheels of said tractor and a belt for connecting said unit with the power take-off pulley on said tractor.

GOODWIN THORTVEDT.